United States Patent [19]

Werner et al.

[11] Patent Number: 4,698,371

[45] Date of Patent: Oct. 6, 1987

[54] PROCESS FOR THE PREPARATION OF OPTIONALLY CELLULAR POLYURETHANE-POLYUREA MOLDED PARTS USING URETHANE GROUP- AND ISOCYANURATE GROUP-CONTAINING 2,4- AND/OR 2,6-TOLUENE DIISOCYANATES

[75] Inventors: Frank Werner, Neustadt; Matthias Marx, Bad Durkheim; Hans U. Schmidt, Ludwigshafen, all of Fed. Rep. of Germany

[73] Assignee: BASF Aktiengesellschaft, Ludwigshafen, Fed. Rep. of Germany

[21] Appl. No.: 780,410

[22] Filed: Sep. 26, 1985

[30] Foreign Application Priority Data

Feb. 10, 1984 [DE] Fed. Rep. of Germany ....... 3436098

[51] Int. Cl.$^4$ ................................................ C08J 9/14
[52] U.S. Cl. .................................... 521/131; 264/45.3; 264/53; 264/54; 264/DIG. 83; 521/157; 521/159; 521/163
[58] Field of Search ................ 264/DIG. 83, 45.3, 53, 264/54, DIG. 5; 521/131, 157, 159, 163

[56] References Cited

U.S. PATENT DOCUMENTS

| 2,778,810 | 1/1957 | Müller et al. |
| 3,099,516 | 7/1963 | Henrickson . |
| 3,105,062 | 9/1963 | Graham et al. . |
| 3,248,372 | 4/1966 | Bunge . |
| 3,267,050 | 8/1966 | Kuryla et al. . |
| 3,304,273 | 2/1967 | Stamberger ..................... 521/157 X |
| 3,383,351 | 5/1968 | Stamberger . |
| 3,428,610 | 2/1969 | Klebert . |
| 3,523,093 | 8/1970 | Stamberger ..................... 521/157 X |
| 4,048,105 | 9/1977 | Salisbury . |
| 4,102,833 | 7/1978 | Salisbury ............................ 521/159 |
| 4,218,543 | 8/1980 | Weber et al. .................. 264/45.5 X |
| 4,296,212 | 10/1981 | Ewen et al. ................ 264/DIG. 83 |
| 4,298,701 | 11/1981 | Meyborg et al. ........... 264/DIG. 83 |
| 4,374,210 | 2/1983 | Ewen et al. ......................... 521/159 |
| 4,379,105 | 4/1983 | Taylor et al. ............... 264/DIG. 83 |
| 4,525,491 | 6/1985 | Narisawa et al. .......... 264/DIG. 83 |
| 4,582,887 | 4/1986 | Dominguez et al. ....... 264/DIG. 83 |
| 4,590,219 | 5/1986 | Nissen et al. ............... 264/DIG. 83 |

FOREIGN PATENT DOCUMENTS

| 0026915 | 4/1981 | European Pat. Off. . |
| 981935 | 1/1965 | United Kingdom . |
| 987618 | 3/1965 | United Kingdom . |
| 1033912 | 6/1966 | United Kingdom . |
| 1040452 | 8/1966 | United Kingdom . |

Primary Examiner—Philip Anderson
Attorney, Agent, or Firm—John C. Demeter; Joseph D. Michaels

[57] ABSTRACT

The invention relates to a process for the preparation of cellular or non-cellular polyurethane-polyurea molded articles. The new process involves the use of urethane and isocyanurate group modified 2,4- and/or 2,6-toluene diisocyanate mixtures as the polyisocyanate component to improve the flowability of the reaction mixture without adversely affecting the mechanical properties of the resulting molded articles.

11 Claims, No Drawings

PROCESS FOR THE PREPARATION OF OPTIONALLY CELLULAR POLYURETHANE-POLYUREA MOLDED PARTS USING URETHANE GROUP- AND ISOCYANURATE GROUP-CONTAINING 2,4- AND/OR 2,6-TOLUENE DIISOCYANATES

BACKGROUND OF THE INVENTION

1. Field of the Invention

The present invention relates to the preparation of crosslinked plastics by means of the isocyanate addition polymerization where hydroxyl group-containing compounds and polyisocyanates are foamed in molds in the presence of blowing agents and catalysts. More particularly, the invention relates to a process to improve the flowability of reactive polyurethane-polyurea systems which have adequate mechanical properties for the resulting molded articles.

2. Description of the Prior Art

The preparation of crosslinked plastics by means of the isocyanate addition polymerization process is known. According to Federal Republic of Germany AS No. 11 96 864 (U.S. Pat. No. 3,099,516), hydroxyl group-containing compounds and polyisocyanates are foamed in molds in the presence of blowing agents and catalysts.

By properly selecting the hydroxyl group-containing polyesters, polyethers, polyesteramides, etc. and the organic polyisocyanates, as well as by additionally using chain extenders such as glycols or diamines, this method may be used to produce elastic as well as rigid polyurethanes, as well as all intermediate modifications.

According to Federal Republic of Germany Pat. No. 831 604 (U.S. Pat. No. 2,778,810), isocyanate group-containing prepolymers are first prepared from the hydroxyl group-containing compounds and polyisocyanates in order to prepare the polyurethane elastomers. The prepolymers are then reacted in a second step with the chain extenders to form high molecular weight elastomers.

Generally, it has not been possible to use diamines as chain extenders in the one-shot process. According to Federal Republic of Germany AS No. 11 49 523 (U.S. Pat. No. 3,105,062), crystalline, aromatic primary diamines in amounts insufficient to saturate the isocyanate group are incorporated in the liquid, isocyanate group-containing prepolymers at a temperature below the melting point of the diamine. The mixtures are then cured by applying heat. According to Federal Republic of Germany Pat. No. 12 40 654 (U.S. Pat. No. 3,428,610), the isocyanate group-containing prepolymers are reacted at room temperature or at moderately elevated temperatures with those liquid or dissolved aromatic diamines which possess at least one linear alkyl substituent in the ortho position relative to the amino group and which possess two linear alkyl substituents having from 1 to 3 carbon atoms in the ortho position relative to the second amino group.

A process for the preparation of optionally cellular, elastic molded articles having a closed skin made of polyurethane-polyurea elastomers using the reaction injection molding (RIM) technique is described in Federal Republic of Germany AS No. 26 22 951, (U.S. Pat. No. 4,218,543). The cited systems are essentially comprised of organic polyisocyanates, polyols, reactive aromatic di- or polyamines which are substituted by alkyl groups in the ortho position relative to the amino group, and strong catalysts for the reaction between the hydroxyl and isocyanate groups. Here it is essential that the aromatic di- or polyamine be miscible in all proportions with polyols having molecular weights from 1800 to 12,000, and further that the alkyl substituents contain from 1 to 3 carbon atoms, whereby at least two of the alkyl substituents must contain 2 to 3 carbon atoms and each of the ortho positions relative to the amino groups must be substituted. Such systems possess cream times down to less than one second. The transition from the liquid into the solid phase occurs almost instantly, which causes the liquid reaction mixture to solidify uniformly on the walls of the mold.

It is also known that the reactivity of aromatically bonded amino groups with respect to isocyanates can be reduced sharply by electrophilic substituents. Examples of such aromatic diamines are provided in Federal Republic of Germany Pat. No. 12 16 538 (GB Pat. No. 981,935): 3,3'-dichloro-4,4'-diaminodiphenylmethane, 3,3'-dinitro-4,4-diaminodiphenylmethane. Because of the associated health hazards, the processing of such substances is complex and expensive and is subject to burdensome regulations. However, the highly electronegative substituents in these compounds lower the reactivity of the aromatically bonded amino groups so severely that it can require up to 15 minutes to fully cure parts produced by means of reaction molding, so that the use of such compounds is not economical.

Polyurethane-polyurea formulations having somewhat reduced reactivity compared with the systems described in Federal Republic of Germany AS No. 26 22 951 are obtained according to European patent application No. 26 915 when 3,3', 5,5'-tetraalkyl-substituted 4,4'-diaminodiphenylmethanes in which the alkyl radicals are identical or different and signify a methyl, ethyl, isopropyl, sec-butyl or tert-butyl radical, whereby at least one of the substituents must be an isopropyl or sec-butyl radical, are used as the aromatic diamines. The cited tetraalkyl-substituted diaminodiphenylmethanes are very easily miscible at room temperature with the required amounts of polyols. They exhibit little or no tendency to crystallize, so that these formulations are easily handled under conditions typical of conventional RIM systems. However, it is been found that the cited tetraalkyl-substituted 4,4'-diaminodiphenylmethanes may be too reactive for special applications.

Compared to European patent application No. 26 915, somewhat more reactive polyurethane-polyurea formulations are described in European patent application No. 69 286. Trialkyl-substituted meta-phenylenediamines are used as the aromatic diamines, whereby two of the alkyl-substituents must be identical or different and must be linear or branched alkyl radicals having from 1 to 4 carbon atoms and the third alkyl radical must possess from 4 to 12 carbon atoms or be a five- or six-membered cycloalkyl radical. Even at relatively high diamine content, these formulations exhibit flowability and they produce molded articles having high dimensional stability at elevated temperatures and no progressive drop in shear modulus curves between 100° and 200° C.

The use of isocyanate group-containing prepolymers and quasiprepolymers having isocyanate contents between 9 and 31 percent by weight, prepared by using optionally modified 4,4'-diphenylmethane diisocyanate, is known from U.S. Pat. Nos. 4,048,105; 4,102,833; and 4,374,210.

In the known processes, 4,4'-diphenylmethane diisocyanate or carbodiimide group-containing or urethane group-containing polyisocyanate mixtures based on 4,4'-diphenylmethane diisocyanate which are liquid at room temperature are used almost exclusively as the organic polyisocyanates, since molded parts produced in a similar manner using non-modified toluene diisocyanates did not exhibit sufficient green strength, cured too slowly, and did not have adequate mechanical properties. Efforts have been made to match the reactivity of the RIM systems to the requirements of the molds, for example its geometry, by selecting suitable substituted diamines and catalysts. The disadvantage of this method, though, is that the aromatic diamines which are used not only affect the reactivity of the RIM systems, but that they also affect the mechanical properties of the resulting molded articles, so that molded articles having certain three-dimensional shapes, for example, could not be produced or could only be produced with reduced mechanical properties, since the required reactive polyurethane mixtures were not sufficiently free-flowing.

SUMMARY OF THE INVENTION

The objective of the invention herein was to improve the flowability of reactive polyurethane-polyurea systems without adversely affecting the mechanical properties of the resulting molded articles, for example articles made from diphenylmethane diisocyanate. It was also essential that the resulting molded articles have sufficient green strength in order to achieve fast demolding times, e.g. from 3 to 60 seconds.

This objective was unexpectedly met through the use of modified toluene diisocyanates.

Thus, the subject of the invention is a process for the preparation of cellular or non-cellular polyurethane-polyurea articles by the reaction of (a) a modified organic polyisocyanate, (b) a higher molecular weight compound having at least two reactive hydrogen atoms, (c) an aromatic diamine, in the presence of (d) a catalyst, and optionally (e) a low molecular weight polyfunctional-polyhydroxyl compound, (f) a blowing agent, and (g) an auxiliary and/or additive.

The process is a one-shot system using reaction injection molding techniques in closed molds wherein urethane group-and isocyanurate group-containing 2,4- and/or 2,6-toluene diisocyanates having an isocyanate content of from 28 to 45 percent by weight, based on the total weight, are used as the modified organic polyisocyanate (a).

DESCRIPTION OF THE PREFERRED EMBODIMENT

The process of the invention has the advantage that the alkyl-substituted aromatic diamines, which react almost immediately with the optionally modified 4,4'-diphenylmethane diisocyanates in RIM formulations, exhibit reduced reactivity toward the urethane group- and isocyanurate group-containing polyisocyanate mixtures based on 2,4- and/or 2,6-toluene diisocyanates, which may be used in accordance with the invention, thereby extending flowability. This means that molds having complex geometries may be filled with relative ease. Modifying the toluene diisocyanates with urethane groups and isocyanurate groups could eliminate the disadvantages associated with nonmodified toluene diisocyanates in the production of molded articles. Molded articles produced utilizing the invention exhibit the necessary green strength, have excellent dimensional stability at elevated temperatures and a high modulus of elasticity.

The advantages of the process of the invention are particularly apparent when special mixtures cf sterically hindered, highly reactive primary aromatic diamines are used as the aromatic diamines (c). Such mixtures impart self-release properties to the molded articles, so that it is possible to almost completely eliminate the coating of the mold with external release agents and/or the addition of internal release agents, which generally have an adverse effect on paintability.

The following should be noted with respect to system components (a) through (d) and, optionally, (e), (f), and (g):

(a) The urethane group- and isocyanurate group-containing polyisocyanate mixtures of 2,4- or 2,6-toluene diisocyanate or, preferably, mixtures of 2,4- and 2,6-toluene diisocyanate in weight ratios from 63 to 82 to 18 to 37, preferably from 65 to 80 and 20 to 35, respectively, which are suitable for use as the modified organic polyisocyanates, have an isocyanate content of from 28 to 45 percent by weight, preferably from 32 to 43 percent by weight, and they advantageously contain from 0.1 to 12 percent by weight, preferably from 1 to 5 percent by weight urethane groups and 3.2 to 15 percent by weight, preferably 3.5 to 10 percent by weight, isocyanate groups, whereby the percents by weight are based on the total weight of the modified toluene diisocyanate mixture.

In order to introduce the urethane groups, 2,4- and 2,6-toluene diisocyanates or toluene diisocyanate mixtures containing the corresponding isocyanurate groups are preferably reacted with low molecular weight diols having from 2 to 12 carbon atoms, preferably from 2 to 6 carbon atoms or polyoxyalkylene glycols having molecular weights from 106 to approximately 700, preferably from 106 to approximately 250. These diols are reacted with ethylene oxide, 1,2-propylene oxide, or their mixtures at temperatures from 40° C. to 90° C. Typical examples of low molecular weight diols or polyoxyalkylene glycols are: 1,2-ethanediol, 1,2-, 1,3-propanediol, 1,3- and 1,4-butanediol, 1,5- and 1,3-pentanediol, 1,6-hexanediol, 1,8-octanediol, 1,10-decanediol, 1,12-dodecanediol, 2,2-dimethyl-1,3-propanediol, 2,2,4,4-tetramethyl-1,6-hexanediol, 2-ethyl-1,6-hexanediol; diethylene glycol, triethylene glycol, oligomeric polyoxyethylene glycol, tripropylene glycol, oligomeric polyoxypropylene glycols, oligomeric polyoxypropylene-polyoxyethylene glycols, and, preferably, dipropylene glycol.

One process for preparing the urethane group- and isocyanurate group-containing 2,4- and/or 2,6-toluene diisocyanates involves reacting isocyanurate group-containing 2,4- and/or 2,6-toluene diisocyanate, preferably those having an isocyanate content of from 28.1 to 45.1 percent by weight, with the appropriate amounts of diol and/or polyoxyalkylene glycol to form urethane groups. In another version, urethane group-containing 2,4- and/or 2,6-toluene diisocyanates, preferably those having an isocyanate content of from 31.2 to 48.2 percent by weight, may be partially cyclized in the presence of conventional trimerization catalysts such as tris(N,N-dialkylaminoalkyl) hexahydrotriazines or 2,4,6-tris(N,N-dimethylamino)-phenol at temperatures from 70° to 150° C. After the desired isocyanurate group content has been reacted, the catalysts are deactivated, for example, by the addition of organic or inorganic acids, acid chlorides, Lewis acids, etc. Preferably, though, the urethane group- and isocyanurate group-containing 2,4- and 2,6-toluene diisocyanates are prepared by mixing in the appropriate quantitative ratios, preferably those having an isocyanate content of from 20 to 46 percent by weight, and isocyanurate group-containing 2,4- and 2,6-toluene diisocyanates, preferably those having an isocyanate content of from 22 to 46 percent by weight, at temperatures from 70° to 90° C. In order to adjust the isocyanate content of from 28 to 45 percent by weight as cited in accordance with the invention, the urethane group- and isocyanurate group-containing 2,4- and/or 2,6-toluene diisocyanates may optionally be diluted later with monomeric 2,4- and/or 2,6-toluene diisocyanates.

(b) Preferably used as the higher molecular weight compounds (b) having at least two reactive hydrogen atoms are compounds having a functionality of from 2 to 8, preferably from 2 to 4, and a molecular weight of from 1000 to 8000, preferably from 1200 to 6000. Polyetherpolyamines and/or preferably polyols selected from the group consisting of the polyether polyols, polyester polyols, polythioether polyols, polyester amides, hydroxyl group-containing polyacetals, and hydroxyl group-containing aliphatic polycarbonates or mixtures of at least two of the cited polyols are examples of substances which have been used successfully. Preferably, polyester polyols and/or polyether polyols are used.

Suitable polyester polyols may be prepared, for example from organic dicarboxylic acids having from 2 to 12 carbon atoms, preferably aliphatic dicarboxylic acids having from 4 to 6 carbon atoms, and polyfunctional alcohols, for example diols, having from 2 to 12 carbon atoms, preferably from 2 to 6 carbon atoms. Typical dicarboxylic acids are: succinic acid, glutaric acid, adipic acid, suberic acid, azelaic acid, sebacic acid, decane dicarboxylic acid, maleic acid, and fumaric acid. The dicarboxylic acids may be used individually or as mixtures. Instead of the free dicarboxylic acids, corresponding dicarboxylic acid derivatives may also be used, for example, the dicarboxylic acid esters of alcohols having from 1 to 4 carbon atoms or dicarboxylic anhydrides. Preferred are dicarboxylic acid mixtures of succinic, glutaric, and adipic acid in proportions of, for example, 20–35 : 35–50 : 20–32 parts by weight, respectively, and more preferably adipic acid. Examples of difunctional and polyfunctional alcohols, in particular diols, are: ethanediol, diethylene glycol, 1,2- and/or 1,3-propanediol, dipropylene glycol, 1,4-butanediol, 1,5-pentanediol, 1,6-hexanediol, 1,10-decanediol, glycerine, and trimethylolpropane. Preferably used are ethanediol, diethylene glycol, 1,4-butanediol, 1,5-pentanediol, 1,6-hexanediol, or mixtures of at least two of the cited diols, more preferably mixtures of 1,4-butanediol, 1,5-pentanediol, and 1,6-hexanediol. In addition, polyester polyols of lactones, e.g. ε-caprolactone, or hydrocarboxylic acids, e.g. ω-hydroxycaproic acid may be used.

The polyester polyols preferably have a functionality of from 2 to 3 and a molecular weight of from 1000 to 3000, preferably from 1800 to 2500.

Preferred for use as polyols are polyether polyols prepared by anionic polymerization of cyclic ethers with alkali hydroxides as catalysts, for example sodium hydroxide or potassium hydroxide, or alkali alcoholates, for example sodium methylate, sodium or potassium ethylate, or potassium isopropylate, or by the cationic polymerization with Lewis acids such as antimony pentachloride, boron trifluoride etherata, etc., or bleaching earth as catalysts. Preferably used as alkylkene oxides are those having from 2 to 4 carbon atoms in the alkylene radical. The preferred initiator molecule contains from 2 to 8, preferably from 2 to 4 reactive hydrogen atoms bonded to it.

Suitable cyclic ethers are, for example, tetrahydrofuran styrene oxide and epichlorohydrin, and alkylene oxides such as 1,2- and 2,3-butylene oxide, and preferably ethylene oxide and 1,2-propylene oxide. The cyclic ethers may be used individually, alternating one after another, or as mixtures. Typical initiator molecules which may be used are: water, organic dicarboxylic acids such as succinic acid, adipic acid, phthalic acid, and terephthalic acid. Optionally, aliphatic and aromatic N-mono-, N-N- and N,N'-dialkyl substituted diamines having from 1 to 4 carbon atoms in the alkyl radical, such as optionally mono- and dialkyl-substituted ethylene diamine, diethylene triamine, triethylene tetramine, 1,3-propylenediamine, 1,3- and 1,4-butylenediamine, 1,2-, 1,3-, 1,4-, 1,5- and 1,6-hexamethylenediamine, phenylenediamines, 2,4- and and 2,6-toluenediamine and 4,4'-, 2,4'- and 2,2'-diaminodiphenylmethane can be utilized. Typical initiators which may be used are alkanol amines such as ethanolamine, diethanolamine, N-methyl- and N-ethylethanolamine, N-methyl- and N-ethyl-diethanolamine, and triethanolamine, ammonia, hydrazine, and hydrazides. Preferably used are polyfunctional, more preferably di-and/or trifunctional alcohols such as ethanediol, 1,2-propanediol and 1,3-propanediol, diethylene glycol, dipropylene glycol, 1,4-butanediol, 1,6-hexanediol, glycerin, trimethylolpropane, pentaerythritol, sorbitol, and sucrose.

The polyether polyols preferably have a functionality of from 2 to 4 and molecular weights frcm 1000 to 8000, preferably from 1200 to 6000, more preferably from 1800 to 4000. As with the polyester polyols, they may be used individually or in the form of mixtures. They may also be mixed with the polyester polyols as well as the hydroxyl group-containing polyesteramides, polyacetals, polycarbonates, and/or polyether-polyamines.

Typical hydroxyl group-containing polyacetals which may be used are compounds which may be produced from glycols such as diethylene glycol, triethylene glycol, 4,4'-dihydroxyethoxy-diphenyldimethylmethane, hexanediol, and formaldehyde. Suitable polyacetals may also be prepared through the polymerization of cyclic acetals. Typical hydroxyl group-containing polycarbonates which may be used are those of the essentially known type which may be prepared through the reaction of diols such as 1,3-propanediol, 1,4-butanediol, and/or 1,6-hexanediol, diethylene glycol triethylene glycol, or tetraethylene glycol with diaryl carbonates such as diphenyl carbonate, or phosgene.

Among the polyester amides which may be used are, for example, those obtained from polyfunctional saturated and/or unsaturated carboxylic acids or their anhydrides and polyfunctional saturated and/or unsaturated amino alcohols or mixtures of polyfunctional alcohols and amino alcohols and/or polyamines, preferably linear condensates.

Suitable polyether-polyamines may be prepared from the polyether polyols cited above. Examples of preparation methods are the cyano-alkylation of polyoxyalkylene polyols and the subsequent hydrogenation of the nitrile which is formed (U.S. Pat. No. 3,267,050) or the amination of polyoxyalkylene polyols with amines or ammonia in the presence of hydrogen and catalyst (Federal Republic of Germany Pat. No. 12 15 373).

(c) Typical aromatic diamines (c) which may be used in the process of the invention are primary aromatic diamines whose amino groups are sterically hindered toward reacting with modified polyisocyanates by the presence of at least one alkyl substituent in the ortho position relative to each amino group.

However, the following diamine mixtures have been found particularly effective in the preparation of self-releasing RIM formulations, so that the use of said mixtures is preferred.

(I) from 50 to 80 percent by weight, preferably from 65 to 78 percent by weight, of at least one primary, sterically hindered aromatic diamine.

(II) from 20 to 50 percent by weight, preferably from 22 to 35 percent by weight, of at least one unsubstituted or substituted primary aromatic diamine whose amino groups do not exhibit any reduced activity toward modified polyisocyanate as a result of electron-attracting substituents and/or steric-hindering, whereby said percents by weight are based on the total weight of the mixture.

Particularly preferred are primary aromatic diamines which are liquid at room temperature and which are completely or at least partially miscible with component (b) under the processing conditions.

Among the primary aromatic diamines which are preferably used are alkyl-substituted meta-phenylenediamines of formulas

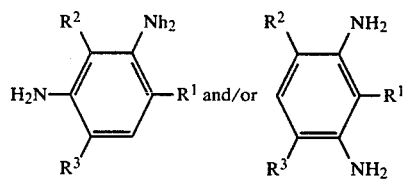

in which $R^1$ is a hydrogen atom or a linear or branched alkyl radical having from 1 to 12 carbon atoms, preferably from 1 to 6 carbon atoms, and $R^2$ and $R^3$ are identical or different linear or branched alkyl radicals having from 1 to 4 carbon atoms, such as the methyl, ethyl, propyl, isopropyl, butyl, or sec-butyl radicals. Preferred are those alkyl radicals $R^1$ where the branching point is at the $C_1$ carbon atom. In addition to hydrogen, the following $R^1$ alkyl radicals are typical: methyl-, ethyl-, N-propyl-, N-isopropyl-, butyl-, hexyl-, octyl-, decyl-, 1-methyloctyl-, 2-ethyl-octyl-, 1-methyl-hexyl-, 1,1-dimethylpentyl-, 1,3,3-trimethyl-hexyl-, 1-ethylpentyl-, 2-ethylpentyl-, and preferably the cyclohexyl-, 1-methyl-n-propyl-, tert-butyl-, 1-ethyl-n-propyl-, 1-methyl-n-butyl-, and 1,1-dimethyl-n-propyl.

Typical alkyl-substituted m-phenylenediamines which may be used are: 2,4-dimethylphenylenediamine, 2,4-diethylphenylenediamine, 2,4-diisopropyl-phenylenediamine, 2,4-diethyl-6-methylphenylenediamine, 2-methyl-4-,6-diethylphenylenediamine, 2,4,6-triethylphenylenediamine, 2,4-dimethyl-6-cyclohexyl-phenylenediamine, 2-cyclohexyl-4,6-diethyl-phenylenediamine, 2-cyclohexyl-2,6-diisopropyl-phenylenediamine, 2,4-dimethyl-6-(1-ethyl-n-propyl)-phenylenediamine, 2,4-dimethyl-6-(1,1-dimethyl-n-propyl)phenylenediamine, and 2-(1-methyl-n-butyl)-4,6-dimethyl-1,3-phenylenediamine.

Alkyl-substituted diaminodiphenylmethanes have also been used successfully, for example, 3,3'-di- and 3,3',5,5'-tetra-n-alkyl-substituted 4,4'-diamino diphenylmethanes such as 3,3'-diethyl, 3,3',5,5'-tetraethyl- and 3,3',5,5'-tetra-n-propyl-4,4'-diamino diphenylmethane.

Preferably used are diamino diphenylmethanes of formula

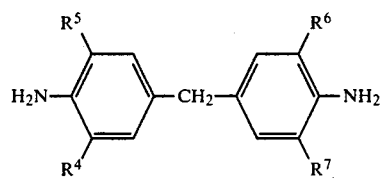

in which $R^4$, $R^5$, $R^6$, and $R^7$ are identical or different and are a methyl, ethyl, propyl, isopropyl, sec-butyl, or tert-butyl radical, and whereby at least one of the radicals must be an ispropyl or sec-butyl radical. The alkyl-substituted 4,4'-diamino diphenylmethanes may also be used in mixtures with isomers of formulas

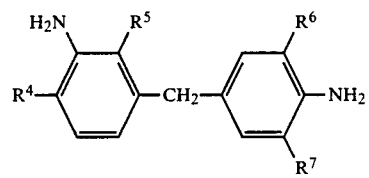

and/or

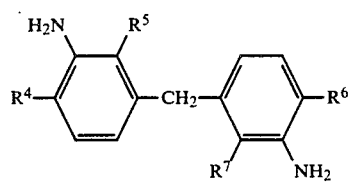

whereby $R^4$, $R^5$, $R^6$, and $R^7$ have the meaning stated above.

Typical examples are: 3,3',5-trimethyl-5'-isopropyl-diamino-diphenylmethane, 3,3',5-triethyl-5'-isopropyl-diamino-diphenylmethane, 3,3',5-trimethyl-5'-sec-butyl-diamino-diphenylmethane, 3,3',5-triethyl-5-'sec-butyl-4,4'-diamino-diphenylmethane, 3,3'-dimethyl-5,5'-diisopropyl-diamino-diphenylmethane, 3,3'-diethyl-5,5'-diisopropyl-diamino-diphenylmethane, 3,3'-dimethyl-5,5'-di-sec-butyl-diamino-diphenylmethane, 3,3'-diethyl-5,5'-di-sec-butyl-diamino-diphenylmethane, 3,5-dimethyl-3',5'-diisopropyl-diamino-diphenylmethane, 3,5-diethyl-3',5'-diisopropyl-, 3,5'dimethyl-3',5'-diisopropyl-diamino-diphenylmethane, 3,5-diethyl-3',5'-diisopropyl-diamino-diphenylmethane, 3,5'-diamino-diphenylmethane, 3-methyl-3',5,5'-triisopropyldiamino-diphenylmethane, 3-ethyl-3',5,5'-triisopropyldiamino-diphenylmethane, 3-methyl-3',5,5'-tri-sec-butyl-diamino-diphenylmethane, 3-ethyl-3',5,5'-tri-sec-butyl- 4,4'-diaminodiphenylmethane, 3,3'-diisopropyl-5,5',di-sec-butyl-diamino-diphenylmethane, 3,5-diisopropyl-3',5'-di-sec-butyl-diamino-diphenylmethane, 3-ethyl-5-sec-butyl-3',5'-diisopropyldiamino-diphenylmethane, 3-methyl-5-tert-butyl-3',5'-diisopropyl-diamino-diphenylmethane, 3-ethyl-5-sec-butyl-3'-methyl-5'-tert-butyl-diamino-diphenylmethane, 3,3',5,5'-tetraisopropyl-diamino-diphenylmethane, and 3,3'5,5'-tetra-sec-butyl-4,4'-diaminodiphenylmethane. Preferably used are the following primary aromatic diamines: 2,4-diethyl-2,4-dimethyl-1,3-phenylenediamine, 2,4,6-triethyl-1,3-phenylenediamine, 2,4-dimethyl-6-tert-butyl-phenylenediamine, 2,4-dimethyl-6-isooctyl-phenylenediamine, and 2,4-dimethyl-6-cyclohexyl-1,3-phenylenediamine, as well as 3,5-dimethyl-3',5'-diisopropyl-phenylenediamine, and 3,3',5,5'-tetraisopropyl-4,4'-diaminodiphenylmethane, and, more preferably, 6-methyl-2,4-diethyl-phenylenediamine and/or 2-methyl-4,6-diethyl-2,3-phenylenediamine.

The primary aromatic diamines may be used individually or in the form of mixtures, for example mixtures of alkyl-substituted 1,3-phenylenediamines, 3,3'-di- and/or 3,3'-5,5'-tetra-alkyl-substituted 4,4'-diaminodiphenylmethanes. In addition, the primary aromatic diamines may be mixed with primary alkyl-substituted aromatic tri- to pentamines in amounts up to maximum 50 percent by weight, based on the total weight, such as polyphenyl-polymethylene polyamines, whereby the aromatic polyamines must be substituted with an alkyl radical at least in the ortho position relative to the amino groups.

Unsubstituted primary aromatic diamines are preferably used as the diamine component. However, substituted primary aromatic diamines in which the reactivity of the amino groups is not negatively affected by substituents may also be used, preferably mono alkyl-substituted aromatic diamines. Typical examples are: 1,2-, 1,3-, and 1,4-phenylenediamine, benzidine, 4,4'- and 2,4'-diaminodiphenylmethane, 4,4'-diaminodiphenylether, 1,5-naphthalenediamine, 1,8-naphthalenediamine, 3,4-, 2,4-, and 2,6-toluenediamine. The aromatic diamines (I) and (II) may also be used individually or as mixtures. Preferably used are 2,4-, and/or 2,6-toluenediamine, and more preferably, 1,3-phenylenediamine.

Mixtures comprising:
(I) from 50 to 80 percent by weight 2,4-dimethyl-6-tert-butyl-1,3-phenylenediamine and, in particular, 6-methyl-2,4-diethyl- and/or 2-methyl-4,6-diethyl-1,3-phenylenediamine, and
(II) from 20 to 50 percent by weight 2,4- and/or 2,6-toluenediamine and, in particular, 1,3-phenylenediamine, whereby the percents by weight are based on the total weight of the mixture of the components;

have proven to be particularly effective as the aromatic diamines and are therefore preferred since they permit the production of cellular or non-cellular polyurethane-polyurea molded parts without the use of external release agents.

Aromatic diamines or preferably the mixture of aromatic diamines (I) and (II) are used in the process of the invention in amounts from 5 to 50 parts by weight, preferably from 10 to 40 parts by weight, and more preferably from 15 to 30 parts by weight based on 100 parts of component (b).

(d) The catalysts (d) include, in particular, compounds which greatly accelerate the reaction of the hydroxyl group-containing compounds of components (b) and (e) with the polyisocyanates. Typical substances which may be used are organometallic compounds, preferably organic tin compounds such as tin (II) salts of organic carboxylic acids, for example tin (II) acetate, tin (II) octoate, tin (II) ethylhexoate, and tin (II) laurate, and the dialkyl tin (IV) salts of organic carboxylic acids, for example, dibutyl tin diacetate, dibutyl tin dilaurate, dibutyl tin maleate, and dioctyl tin diacetate. The organometallic compounds are used individually or, preferably, in combination with highly basic amines. Typical examples are amidines such as 2,3-dimethyl-3,4,5,6-tetrahydropyrimidine, tertiary amines such as triethylamine, dibutylamine, trimethylbenzylamine, N-methyl-N-ethylamine, N-cyclohexylmorpholine, N,N,N',N'-tetramethylene diamine, N,N,N',N'-tetramethylbutanediamine, pentamethyldiethylenetriamine, tetramethyl-diaminoethyl ether, bis(dimethylaminopropyl)urea, dimethylpiperazine, 1,2-dimethylimidazol, 1-azabicyclo(3,3,0)octanes and, preferably, 1,4-diazabicyclo(2,2,2)octane, and alkanol compounds such as triethanolamine, triisopropanolaine, N-methyl and N-ethyl-diethanolamine, and dimethylethanolamine.

The catalysts include: tris(dialkylaminoalkyl)-s-hexahydrotriazines, in particular tris(N,N'-dimethyl-aminopropyl)-s-hexahydrotriazine, tetra-alkylammonium hydroxides such as tetramethylammonium hydroxide, alkali hydroxides such as sodium hydroxide, and alkali alcoholates such as sodium methylate and potassium isopropylate, as well as alkali salts of long chain fatty acids having from 10 to 20 carbon atoms and optionally side hydroxyl groups. Preferably used are from 0.001 to 5 percent by weight, more preferably from 0.05 to 2 percent by weight, catalysts or catalyst combination, based on the weight of component (b).

(e) In addition to the aromatic diamines, it is also preferred to use low molecular weight, polyfunctional-polyhydroxyl compounds (e) to produce the cellular or non-cellular polyurethane-polyurea molded parts.

The essentially known chain extenders and/or crosslinking agents having a functionality of from 2 to 4, preferably 2, and molecular weights less than 500, preferably from 62 to approximately 400, are used as the low molecular weight, polyfunctional-polyhydroxyl compounds. Typical examples are aliphatic and/or aralipthatic diols having from 2 to 14, preferably 2 to 6, carbon atoms such as 1,2-ethanediol, 1,3-propanediol, 1,4-butanediol, 1,5-pentanediol, 1,6-hexanediol, 1,8-octanediol, 1,10-decanediol, 1,12-dodecanediol and bis(2-hydroxyethyl)hydroquinone. Tetrols such as pentaerythritol and oligomeric polyoxyalkylene polyols based on ethylene oxide and/or 1,2-propylene oxide and polyfunctional alcohols, as cited, are used as initiators, for example, diethylene glycol, triethylene glycol, dipropylene glycol, tripropylene glycol, alkoxylated glycerins and alkoxylated trimethylolpropanes. Preferably used are ethanediol, 1,4-butanediol, 1,6-hexanediol, glycerin, and trimethylolpropane. A low molecular weight, polyfuctional-polyhydroxyl compound (e) may be used individually or in the form of mixtures, whereby it is desirable to use from 5 to 50 parts by weight of component (c) and from 0.1 to 20 parts by weight, preferably from 1 to 10 parts by weight of component (e) per 100 parts by weight of component (e).

(f) Water is among the blowing agents (f) which may optionally be used in the process of the invention. The water reacts with isocyanate groups to form carbon dioxide. The amounts of water which may be used effectively range from 0.01 to 5 percent by weight, preferably from 0.5 to 2 percent by weight, based on the weight of component (b).

Other blowing agents which may be used are low boiling-point liquids which evaporate as a result of the exothermic addition polymerization reaction. Suitable are liquids which are inert with respect to the organic polyisocyanate and have boiling points less than 100° C. Examples of such preferably used liquids are halogenated hydrocarbons such as methylene chloride, trichlorofluoromethane, dichlorodifluoromethane, dichloromonofluoromethane, dichlorotetrafluoroethane, and 1,1,2-trichloro-2,2,2-trifluoroethane. Mixtures of these low-boiling point liquids together and/or with other substituted or unsubstituted hydrocarbons may also be used.

The most desirable amount of low-boiling point liquid for producing cellular polyurethane-polyurea molded articles depends on the intended density as well as whether water is optionally used. Generally, amounts from 0.5 to 15 parts by weight, based on 100 parts by weight of component (b), gives satisfactory results.

Auxiliaries and/or additives (g) may also be incorporated into the reaction mixture. Typical examples are surfactants, foam stabilizers, cell regulators, fillers, dyes, pigments, flame retardants, agents to protect against hydrolysis, fungistats, and bacteriostats.

Among the surfactants which may be used here are those which support the homogenization of the components and which ae also suitable for regulating cell structure. Typical examples are emulsifiers such as the sodium salts of castor oil sulphate or of fatty acids as well as salts of fatty acids with amines. for example, oleic acid diethyleneamine or stearic acid diethanolamine, salts of sulfonic acids, for example alkali or ammonium salts of dodecylbenzene- or dinaphthalmethanedisulfonic acid, and ricinoleic acid; foam stabilizers such as siloxane-oxyalkylene heteric polymers and other organic polysiloxanes, oxyethylated alkyl phenols, oxyethylated fatty alcohols, paraffin oils, castor oil or castor oil ester and Turkey red oil; and cell regulators such as paraffins, fatty alcohols, and dimethylpolysiloxanes. The surfactants are generally used in amounts from 0.01 to 5 parts by weight based on 100 parts by weight of component (b).

Fillers are understood to mean the essentially known conventional organic and inorganic fillers, reinforcing agents, weight-increasing agents, substances for improving wear in paints, coatings, etc., in particular the fillers which have a reinforcing effect. Typical examples are: inorganic fillers such as silicate minerals, for example fibrous silicates such as antigorite, serpentine, horn blends, amphiboles, chrysotile, talcum; metal oxides such as kaolin, aluminum oxides, titanium oxides, and iron oxides, metal salts such as chalk, heavy spar, and inorganic pigments such as cadmium sulfide, zinc sulfide, as well as glass, asbestos powder etc. Preferably used are kaolin (China clay), aluminum silicate, and co-precipitates of barium sulfate and aluminum sulfate, as well as natural and synthetic fibrous minerals such as asbestos, wollostonite, and preferably glass fibers of various length, which may also be coated. Typical organic fillers are, for example: coal, melamine, pine resin, cyclopentadienyl resins, and graft polymers based on styrene-acrylonitrile which are prepared through in-situ polymerization of acrylonitrile-styrene mixtures in polyether polyols as described in Federal Republic of Germany Pat. Nos. 11 11 394; 12 22 669; (U.S. Pat. Nos. 3,304,273; 3,383,351; 3,523,093), 11 52 536 (GB No. 1,040,452); and 11 52 537 (GB No. 987,618) and which may be subsequently aminated, as well as filler polyoxyalkylene polyols or filler polyoxyalkylene polyamines in which aqueous polymer dispersions are converted into polyoxyalkylene polyol dispersions or polyoxyalkylene polyamine dispersions. The inorganic and organic fillers may be used individually or as mixtures. Preferably used are stable filler polyoxyalkylene polyol dispersions in which the fillers have been reduced in size in the presence of polyoxyalkylene polyols in-situ with high localized energy densities to a particle size less than 7 $\mu$m.

It is desirable to incorporate the inorganic and organic fillers in the reaction mixture in amounts of from 0.5 to 50 percent by weight, preferably from 1 to 40 percent by weight based on the weight of components (a) through (c).

Typical flame retardants which may be used are tricresyl phosphate, tris-2-chloroethyl phosphate, tris-chloropropyl phosphate and tris-2,3-dibromopropyl phosphate.

Also inorganic flame retardants can be used to make the molded articles flame resistant. Examples are aluminum oxide hydrate, antimony trioxide, arsenic oxide, ammonium polyphosphate, and calcium sulfate. Generally, it has been found to be desirable to use from 5 to 50 parts by weight, preferably from 5 to 25 parts by weight, of the cited flame retardants per 100 parts by weight of the (b) component.

Further information on the remaining auxiliaries and additives cited above may be found in the technical literature, for example the monograph J. H. Saunders and K. C. Frisch, *Polyurethanes Chemistry and Technology* Part 1, Chemistry; Part II Technology, vol. 16 of *High Polymers*, New York; Interscience Publishers, 1962, 1964; or *Polyurethanes*, vol. 7 of *Kunststoff-Handbuch*, 1st ed., 2nd ed. Munich: Carl Hanser verlag, 1966, 1983.

In order to prepare the optionally cellular polyurethane-polyurea molded articles, the modified organic polyisocyanates (a), higher molecular weight compounds having at least two reactive hydrogen atoms (b), aromatic diamines (c), and optionally low molecular weight, polyfunctional-polyhydroxyl compounds (e) are reacted in such amounts that the equivalent ratio of isocyanate groups in the modified polyisocyanates (a) to the sum of the reactive hydrogen atoms in components (b), (c), and optionally (e) is from 1:0.90 to 1:1.25, preferably from 1:0.98 to 1:1.15, respectively.

The preparation of the cellular and optionally noncellular polyurethane-polyurea molded articles is accomplished using a one-shot process with the aid of the known reaction injection molding technology. This type of processing is described, for example, by Pichota and Ror, *Integralschaumstoff.* Munich: Carl Hanser Verlag, 1973; D. J. Prepelka and J. L. Wharton, *Journal of Cellular Plastics* (March-April 1975): pp 87–98; and U. Knipp, *Journal of Cellular Plastics* (March-April 1973): pp 76–84.

When using a mixing chamber which has several feed nozzles, the basic components may be fed in individually and mixed intensively in the mixing chamber. It has been found to be particularly advantageous to use a two-component process and to dissolve the primary aromatic diamines (c) and low molecular weight, polyfunctional-polyhydroxyl compounds (e) in the high molecular weight compounds having at least two reactive hydrogen atoms (b) and to optionally include in an A component blowing agents, auxiliaries, and additives, and to use the modified organic polyisocyanates as a B component. Some of the advantages here are that the A and B components may be stored separately and may be transported in a space-saving manner, and that only the needed amounts have to be mixed together during processing.

The amount of reaction mixture injected into the mold is such that the resulting non-cellular molded article has a density of from 1.0 to 1.4 g/cm$^3$, preferably from 1:0 to 1.2 g/cm$^3$ and the cellular molded part has a density of from 0.7 to 1.2 g/cm$^3$, preferably from 0.8 to 1.0 g/cm$^3$. The initial components are fed into the mold at a temperature of from 15° to 80° C., preferably from 20° to 55° C. The desirable mold temperature is from 20° to 90° C., preferably from 30° to 75° C. The degree of compression used to produce the microcellular or cellular molded articles is from 1.1 to 8, preferably from 2 to 8.

The non-cellular or microcellular polyurethane-polyurea molded articles obtained through the process of the invention are particularly suitable for use in the automobile industry, for example as bumper covers, impact protection moldings, and body articles such as roof moldings, fenders, spoilers, and wheelhouse extensions as well as engineering housing components, rolls, and shoe soles. The cellular foams are used, for example, as arm rests, head supports, and safety coverings in automobile interiors as well as motorcycle and bicycle saddles and coverings in composite foams.

The parts cited in the examples below refer to parts by weight.

COMPARISON EXAMPLE

Component A

A mixture of:
(1) 77.8 parts of a polyoxypropylene-polyoxyethylene triol having a hydroxyl number of 26, prepared through the anionic addition polymerization of first 1,2-propylene oxide and ethylene oxide with trimethylolpropane as an initiator,
(2) 21.0 parts of a mixture comprising 80 parts by weight 6-methyl-2,4-diethyl-1,3-phenylenediamine and weight 2-methyl-4,6-diethyl-1,3-phenylenediamine,
(3) 1.0 parts 1,4-diazabicyclo(2,2,2)octane in dipropylene glycol (33 percent by weight solution), and
(4) 0.2 parts dibutyl tin dilaurate.

Component B

A mixture of 2,4- and 2,6-toluene diisocyanate in an 80:20 weight ratio having an isocyanate content of 48.3 percent by weight.

The A and B components were heated to 50° C. and processed in a weight ratio of 100:25.7 parts—corresponding to an isocyanate index of 1.05. A reaction injection molding process on a high pressure model PUROMAT ® 30 metering machine from Elastogran-Maschinebau GmbH was utilized. The components were processed into molded boards with dimensions of 4×400×200 mm in an aluminum mold at a temperature of 50° C. The mold was opened after 20 seconds, and the hardness of the molded boards was measured as a function of time.

The test results are summarized in Table 1.

The resulting molded board was conditioned at 120° C. for 1 hour. Then the following mechanical properties were measured on the molded board:

| | | |
|---|---|---|
| Density per DIN 53 420 | (kg/m$^3$) | 1,090 |
| Tensile strength per DIN 53 504 | (N/mm$^2$) | 19.5 |
| Elongation per DIN 53 504 | (%) | 475 |
| Graves Tear Propogation per DIN 53 515 | (N/mm) | 84 |
| Shore D Hardness per DIN 53 505 | | 48 |
| Modulus of Flexural Elasticity per DIN 53 457 | (N/mm$^2$) | 191 |
| Dimensional Stability at Elevated Temperature ISO-R-75, Method B | (°C.) | 111 |

EXAMPLE 1

Component A

A mixture of:
(1) 72.7 parts of a polyoxypropylene-polyoxyethylene triol with a hydroxyl number of 26 according to the Comparison Example,
(2) 21.0 parts of the 6-methyl-2,4-diethyl- and 2-methyl-4,6-diethyl-1,3-phenylenediamine mixture of the comparison example,
(3) 5.0 parts of a trimethylolpropane ethylene oxide adduct having a hydroxyl number of 945,
(4) 1.0 parts 1,4-diazabicyclo(2,2,2)octane in dipropylene glycol (33 percent by weight solution), and
(5) 0.3 parts dibutyl tin dilaurate. Component B: A modified urethane and isocyanurate group-containing polyisocyanate mixture comprised of 2,4- and 2,6-toluene diisocyanates in a 80:20 weight ratio. The polyisocyanate mixture had an isocyanate content of 40 percent by weight, a urethane group content of 2.2 percent by weight, and an isocyanate group content of 4.4 percent by weight, each based on the total weight. This mixture was prepared by reacting the toluene diisocyanate mixture with dipropylene glycol at 60° C, adding tris(N,N,-dimethylaminopropyl)-s-hexahydrotriazine as a trimerization catalyst trimerizing to an isocyanate content of 24 percent by weight, whereby the temperature increased to 130° C. and mixing the resulting reaction product with a toluene diisocyanate.

The A and B components were heated o 50° C, mixed in a weight ratio of 100:40.1 parts-corresponding to an isocyanate index of 1.05-and were processed into molded boards as described in the Comparison Example.

The increase in hardness was measured on the molded board as described in the Comparison Example and the following mechanical properties were observed after conditioning for 1 hour at 120° C.

| | | |
|---|---|---|
| Density per DIN 53 420 | (kg/m$^3$) | 1,070 |
| Tensile strength per DIN 53 504 | (N/mm$^2$) | 26 |
| Elongation per DIN 53 504 | (%) | 210 |
| Graves Tear Propagation per DIN 53 515 | (/mm) | 79 |
| Shore D Hardness per DIN 53 505 | | 58 |
| Modulus of Flexural Elasticity per DIN 53 457 | (N/mm$^2$) | 420 |
| Dimensional Stability at Elevated Temperature | (°C.) | 118 |

EXAMPLE 2

Component A

A mixture of:
(1) 71.7 parts of the polyoxypropylene-polyoxyethylene triol having a hydroxyl number of 26 of the Comparison Example,
(2) 24.0 parts of the 6-methyl-2,4-diethyl- and 2-methyl-4,6-diethyl-1,3-phenylenediamine mixture of the Comparison Example,
(3) 3.0 parts of a trimethylolpropane ethylene oxide adduct having a hydroxyl number of 945,
(4) 1.0 parts 1,4-diazabicyclo(2,2,2)octane in dipropylene glycol (33 percent by weight solution), and
(5) 0.3 parts dibutyl tin dilaurate.

Component B

Urethane and isocyanurate group-containing polyisocyanate mixture of 2,4- and 2,6-toluene diisocyanates of Example 1.

The A and B components were heated to 50° C., mixed in a weight ratio of 100:40.2 parts-corresponding to an isocyanate index of 1.05-and were processed into molded boards as described in the Comparison Example.

The increase in hardness was measured on the molded board as described in the Comparison Example and the following mechanical properties were observed after conditioning for one hour at 120° C.

| | | |
|---|---|---|
| Density per DIN 53 420 | (kg/m$^3$) | 1,058 |
| Tensile strength per DIN 53 504 | (N/mm$^2$) | 21 |
| Elongation per DIN 53 504 | (%) | 160 |
| Graves Tear Propagation per DIN 53 515 | (N/mm) | 50 |
| Shore D Hardness per DIN 53 505 | | 59 |
| Modulus of Flexural Elasticity per DIN 53 457 | (N/mm$^2$) | 440 |
| Dimensional Stability at Elevated Temperature ISO-R-75, Method B | (°C.) | 147 |

EXAMPLE 3

Component A

A mixture of:
(1) 70.7 parts of the polyoxypropylene-polyoxyethylene triol having a hydroxyl number of 26 of the Comparison Example,
(2) 21.0 parts of the 6-methyl-2,4-diethyl- and 2-methyl-4,6-diethyl-1,3-phenylenediamine mixture of the Comparison Example,
(3) 5.0 parts of a trimethylolpropane ethylene oxide adduct having a hydroxyl number of 945,
(4) 1.0 parts 1,4-diazabicyclo(2, 2, 2)octane in dipropylene glycol (33 percent by weight solution),
(5) 0.3 parts dibutyl tin dilaurate and
(6) 2.0 parts m-phenylenediamine.

Component B

Urethane-and isocyanurate group-containing polyisocyanate mixture of 2,4- and 2,6-toluene diisocyanates of Example 1.

The A and B components were heated to 50° C, mixed in a weight ratio of 100:44.1 parts-corresponding to an isocyanate index of 1.05 - and were processed into molded boards as described in the Comparison Example.

The increase in hardness was measured on the molded board as described in the Comparison Example and the following mechanical properties were observed after conditioning for 1 hour at 120° C.

| | | |
|---|---|---|
| Density per DIN 53 420 | (kg/m$^3$) | 1,109 |
| Tensile strength per DIN 53 504 | (N/mm$^2$) | 23 |
| Elongation per DIN 53 504 | (%) | 104 |
| Graves Tear Propagation per DIN 53 515 | (N/mm) | 31 |
| Shore D Hardness per DIN 53 505 | | 62 |
| Modulus of Flexural Elasticity per DIN 53 457 | (N/mm$^2$) | 500 |
| Dimensional Stability at Elevated Temperature ISO-R-75, Method B | (°C.) | 139 |

TABLE I

Hardness of the molded boards as a function of time elapsed from start of reaction.

| | Comparison Example | Example 1 | Example 2 | Example 3 |
|---|---|---|---|---|
| Seconds | Shore D Hardness | | | |
| 30 | 31 | — | — | — |
| 40 | 13 | 34 | 38 | 38 |
| 50 | 16 | 35 | 39 | 40 |
| 60 | 18 | 36 | 41 | 43 |
| 90 | 20 | 40 | 43 | 46 |

The embodiments of the invention in which an exclusive privilege or property is claimed are defined as follows:

1. A process for the preparation of a cellular or noncellular polyurethane-polyurea molded article using closed mold one-shot reaction injection molding techniques comprising reacting
   (a) a urethane and isocyanurate modified 2,4-and/or 2,6-toluene diisocyanate having an isocyanate content of from 28 to 45 percent by weight, based on total weight of the modified isocyanate,
   (b) a higher molecular weight compound having at least two reactive hydrogen atoms, having a functionality of from 2 to 8 and a molecular weight of from 1000 to 8000, and
   (c) an aromatic diamine, in the presence of
   (d) a catalyst, and optionally
   (e) a low molecular weight polyfunctional polyhydroxyl compound having a functionality of from 2 to 4 and a molecular weight less than 500,
   (f) a blowing agent,
   (g) an auxiliary and/or additive.

2. The process of claim 1 wherein the urethane group and isocyanurate group-containing 2,4- and/or 2,6-toluene diisocyanate contains from 0.1 to 12 percent by weight urethane group and from 3.2 to 15 percent by weight isocyanurate group, said weight percents base on the total weight of the modified polyisocyanate.

3. The process of claim 1 wherein mixtures of 2,4- and 2,6-toluene diisocyanate in a weight ratio of 63-82 to 18-37 are used as said toluene diisocyanate.

4. The process of claim 1 wherein a diol having from 2 to 12 carbon atoms in the alkylene radical and/or polyoxyalkylene glycol having a molecular weight range of from 106 to 700 is used to modify the organic polyisocyanate.

5. The process of claim 1 wherein 6-methyl-2,4-diethyl-and/or 2-methyl-4,6-diethyl-1,3-phenylenediamine are used as said aromatic diamine.

6. The process of claim 1 wherein mixtures of
(I) from 50 to 80 percent by weight of a primary diamine whose amino group is sterically hindered with respect to said modified polyisocyanate by an alkyl substituent in the ortho position to each amino group, and
(II) from 20 to 50 weight percent of an unsubstituted or substituted primary aromatic diamine whose amino group does not exhibit any reduced reactivity to said modified polyisocyanate due to an electrophilic substituent and/or steric hinderance are used as said aromatic diamine, whereby the percents by weight are based on the total weight of said mixtures.

7. The process of claim 1 wherein mixtures comprised of from 50 to 80 percent by weight 6-methyl-2,4-diethyl- and 2-methyl-4,6-diethylphenyle diamine are used as said aromatic diamine.

8. The process of claim 1 wherein said low molecular weight polyfunctional hydroxyl compound has a functionality of from 2 to 4 and a molecular eight of from 62 to 400.

9. The process of claim 1 wherein the equivalent ratio of said isocyanate group in the modified organic polyisocyanate (a) to the sum of the hydroxyl and amino groups in components (b), (c), and optionally (e), is from 1:0.90 to 1:1.25.

10. The process of claim 1 wherein from 5 to 50 parts by weight of component (c) and from 0.1 to 20 parts by weight of component (e) are used per 100 parts by weight of component (b).

11. The article prepared by the process of claim 1.

* * * * *

UNITED STATES PATENT AND TRADEMARK OFFICE
CERTIFICATE OF CORRECTION

PATENT NO. : 4,698,371
DATED : October 6, 1987
INVENTOR(S) : FRANK WERNER ET AL

It is certified that error appears in the above-identified patent and that said Letters Patent is hereby corrected as shown below:

Column 18, line 3: "diethylphenyle diamine"

should read diethylphenylene-1,3-diamine.

Signed and Sealed this

Twenty-second Day of March, 1988

Attest:

DONALD J. QUIGG

Attesting Officer

Commissioner of Patents and Trademarks